(No Model.)

C. P. CLARK, Jr.
FREIGHT BLANK.

No. 520,353.            Patented May 22, 1894.

*Fig. 1.*

*Fig. 2.*

Attest                          Inventor

Walter Donaldson        Charles Peter Clark Jr

F. L. Middleton          by Ellis Spear

Atty.

THE NATIONAL LITHOGRAPHING COMPANY,
WASHINGTON, D. C.

UNITED STATES PATENT OFFICE.

CHARLES PETER CLARK, JR., OF NEWTON, MASSACHUSETTS.

FREIGHT-BLANK.

SPECIFICATION forming part of Letters Patent No. 520,353, dated May 22, 1894.

Application filed November 26, 1892. Serial No. 453,293. (No model.)

*To all whom it may concern:*

Be it known that I, CHARLES PETER CLARK, Jr., a citizen of the United States of America, residing at Newton, in the county of Middlesex and State of Massachusetts have invented certain new and useful Improvements in Freight-Blanks, of which the following is a specification.

My invention is an improved freight blank and is designed to simplify the arrangement of the blanks as at present used; to reduce the cost of production; minimize the number of sheets or slips used; enable the use of a good quality of paper, and at the same time insure perfect accuracy and secure every result aimed at in the blanks now in use, with a minimum amount of duplication in the filling out of the spaces contained on the blanks. Three different sections of a freight blank are essential, namely, the freight bill proper, the delivery check, and thirdly a section for the cashier, the two latter sections in some cases being substantial duplicates of the first sheet. This has required heretofore in the best methods used, three forms or blanks which have been used as three separate sheets, or as a single sheet folded, necessitating the use of two carbon sheets to manifold on the two under sheets the writing on the face sheet; and also, the use of thin paper because of the number of thicknesses, which is a serious objection, without considering the time used in handling the three sheets and the two carbons, or the expense of printing, and also the liability of confusion arising from the use of so many separate sheets. I have found however, that three sheets are not necessary, as while the three sections of the blank referred to are essential, they do not require the written matter to be duplicated in each, as only a portion of the information on the first or freight bill is required upon the other two, and as the information necessary on the delivery check does not include the date required on the cashier's check, it will be seen that the full information on the freight bill proper may be applied by the use of a carbon sheet to a compound sheet beneath the freight bill adapted to contain all the information upon the face bill, but separable to form the one part the delivery check, and the other part the cashier's check.

Thus but two slips or pages are necessary, and but the use of a single sheet of carbon paper, while no unnecessary information is contained either on the delivery or cashier's check but only that required, while at the same time by the one writing on the face bill the two checks are properly made out.

The drawings illustrate my invention in the most convenient form, in which—

Figure 1 is a view of the face or freight bill proper. Fig. 2, is a face view of the under sheet composed of the delivery and cashier's checks, the upper sheet being shown as folded back the face view being represented in dotted lines and in reverse.

It will be understood that while I have shown certain matter printed on the bills I not do limit myself in this connection as this matter is ordinary, and no part of my invention which relates entirely to the structure and relative arrangement of the parts of the blank, and consequently the printed matter may be changed to meet other conditions and requirements without departing from the spirit of my invention.

In the drawings I have also shown the freight bill proper as the face check, but this is not essential, as the compound sheet may be the face bill though this is not so convenient.

The freight bill proper, which is generally of usual form containing the usual printed matter is shown at A and contains in addition to the other printed matter, blanks for the article and the number, thereof, with the weight, the feet, the rate and the charges, in four successive columns. I do not limit myself however to the arrangement and number of columns shown as in some instances these blanks are used with simply spaces for the description of the articles and spaces for the charges. These colums are filled out properly with a carbon sheet beneath the sheet A so that the matter inserted may be duplicated by the same writing upon the under sheet B. This under sheet is composed of a delivery check C and cashier's check D, but as the delivery check only needs the description of the articles, this check is only made of a length sufficient to extend to and include in the present case the column in which the feet are indicated, while as the retained or cashier's check is required to contain only the charges, and the rate if desired, this check extends from the feet column of the check A to the end of the check, so as to include the two columns of the main check under the head of rate and charges and it will thus be seen that in filling out the main check A the two checks C, D, are also properly filled out as exact duplicates of that part of the check A required on each of the checks C, D. These checks as generally used, are given a progressive number beginning with the first of each month and these numbers may be stamped on if desired or applied in any convenient way, or omitted if other systems of identification be used. As the cashier's check in the use of the progressive numbers does not require the day of the month by reason of the successive numbers indicating their relation to each other, but by reason of the numbers beginning anew each month, does require the month, and as the month is not important in the delivery check as it may appear elsewhere, while the day of the month is, I change the usual order of the day, month and year, to the year first, then the day and then the month which gives me the full date in the check A, the year and day on the check C, and the month in the cashier's check, and then the necessary information is complete for each check with the one writing. These checks may be arranged in any convenient way in block form, or book form, or used loosely as may be desired, but each check is so distinctive, both as to the matter contained on it, and by reason of the difference in size, that no confusion can arise.

I claim—

A freight blank, composed of two leaves, one consisting of a main freight bill and the other a compound leaf to form a delivery check and cashier's check, said second leaf being arranged relatively to the main bill so that the delivery check receives the description of the article and the cashier's check the financial data, said cashier's check being at the end of the delivery check and separable therefrom, substantially as described.

In testimony whereof I affix my signature in presence of two witnesses.

CHARLES PETER CLARK, JR.

Witnesses:
 GEORGE L. WINLOCK,
 GEO. C. GLIDDEN.